United States Patent [19]

Scholz

[11] 3,892,994
[45] July 1, 1975

[54] VIDICON CAMERA TUBE WITH INTERNAL LIGHT SOURCE FOR SETTING DARK CURRENT LEVEL

[75] Inventor: Hans Scholz, Essex, England

[73] Assignee: English Electric Valve Company Limited, Chelmsford, England

[22] Filed: May 13, 1974

[21] Appl. No.: 469,323

[30] Foreign Application Priority Data

June 23, 1973  United Kingdom............... 29933/73

[52] U.S. Cl................................. 313/371; 313/484
[51] Int. Cl.²..................... H01J 29/45; H01J 31/28
[58] Field of Search ............ 313/371, 372, 384, 382

[56] References Cited
UNITED STATES PATENTS 3,751,703  8/1973  Weijland et al..................... 313/384

*Primary Examiner*—Robert Segal
*Attorney, Agent, or Firm*—Baldwin, Wight & Brown

[57]  ABSTRACT

A camera tube, in particular a vidicon tube, is provided with a lamp arranged to provide illumination of the target electrode to reduce the effect known as "build-up lag." Undesirable internal reflections are reduced by the provision of light absorbing material in the vicinity of the window of the tube. The internal reflections would otherwise result in unacceptable variations in the intensity of illumination in different regions of the target electrode.

9 Claims, 1 Drawing Figure

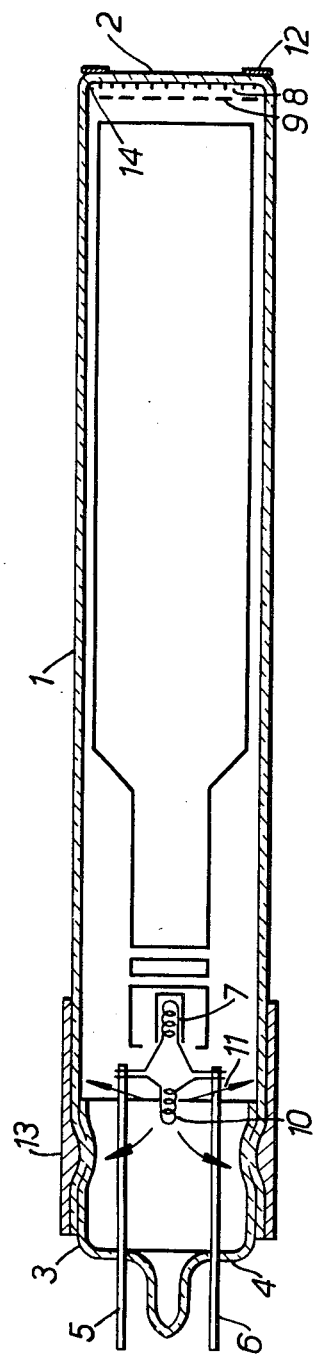

VIDICON CAMERA TUBE WITH INTERNAL LIGHT SOURCE FOR SETTING DARK CURRENT LEVEL

This invention relates to camera tubes and more particularly to camera tubes of the vidicon type.

Vidicon type camera tubes, and in particular those which employ lead oxide photo conductor targets, tend to suffer from a phenomenon known as "build up lag," that is to say an inability of the camera tube to respond instantaneously to a black to white change in the content of the scene being viewed.

Build up lag is particularly troublesome in the case of low luminance colour television picture signal generation where, due to the difference in build up lag between the chrominance tubes, moving objects lose colour fidelity, particularly on their leading edges.

The present invention seeks to provide an improved camera tube of the vidicon type in which the effect of build up lag is reduced.

According to this invention a camera tube of the vidicon type has a light source within its envelope and is arranged such that in operation light from said source is conducted via a wall of said envelope to the window area thereof to illuminate the front of the tube target to cause a small quiescent current to flow therein tending to reduce build up lag effects, there being provided means for reducing the effect of internal reflection within the envelope wall around said window area so as to tend to cause uniform illumination of the front of the tube target by light from said source.

Without the last mentioned means, it has been found that undesirable variations in black level shading occur across the target due to non-uniform values of quiescent current flowing in different parts of the target.

In a tube in accordance with the present invention non-uniformity in the quiescent current is reduced by improving the uniformity with which the front of the target is illuminated with light from the source.

Preferably said last mentioned means comprises light absorbent material provided on the outside of the tube envelope and framing the window area thereof.

The extent of the light absorbing material may be optimised for any particular tube to provide as uniform black level shading as possible. Typically, however, the light absorbing material extends from the edge of the face of the tube inwardly towards the window area and ends approximately at the projected outer boundary of the target mesh electrode of the tube.

One example of a suitable light absorbing material is matt black cellulose. The thickness of the light absorbing coating is not critical. The light source is normally located on the axis of the tube and preferably comprises a single filament positioned in the region between the cathode heater of the tube and the base of the tube through which the connectors for the various electrodes of the tubes pass.

The source may be electrically connected to and supported by the connector pins for the heater of the tube so as to operate in parallel therewith.

Typically a quiescent current of one to three nanoamps is required to flow in the photo conductive target and a suitable light source has been found to be a filament similar to the heater filament of the cathode of the camera tube.

In order to provide a measure of control of the quiescent current flowing in the photo conductive target, the position of the light source along the axis of the tube may be varied prior to assembly and/or light absorbent material may be provided on the tube envelope in the region of the light source, so as to absorb a proportion of the light from the source which enters the envelope walls.

The invention is illustrated in and further described with reference to the accompanying DRAWING which illustrates a vidicon tube of the kind having a lead oxide photo conductive target, in accordance with the present invention.

Referring to the drawing, the vidicon tube has a glass envelope 1, which consists of a generally cylindrical portion which is closed at one end to form the face 2 of the tube. The other end of the tube is closed by a skirt glass 3, providing the base 4 of the tube, through which conducting pins for making connection to the electrodes of the tube pass. Only two pins, 5 and 6 are shown, these being the connecting pins for the cathode heater 7 of the tube.

On the interior surface of the face 2 is provided a lead oxide photo conductive target 8. Closely spaced from target 8 is the field mesh 9 of the tube. The remaining electrodes of the tube are represented, but will not be referred to in detail and as so far described in vidicon tube is well known per se.

In accordance with the present invention, a light source 10 is connected between connector pins 5 and 6, in the interior of the tube envelope, to lie on the axis of the tube between the cathode heater 7 and the base 4 of the tube. In this particular example the light source 10 is a filament identical to the cathode heater 7. Light from the source 10, represented by the arrows 11, enters the wall of the envelope and is conducted down the length of the tube to the face wall of the tube where it illuminates the front of the target 8 to cause a small quiescent current to flow therein which reduced the effect of build up lag.

On the face 2 of the tube is provided absorbent material in the form of matt black cellulose 12, framing the window area of the tube. The absorbent material 12 extends from the edge of the face of the tube inwardly approximately to the projected outer boundary of the field mesh 9. The effect of light absorbent material 12 is to reduce the internal reflection effect around the window area edge, which, it has been found, tends to result in more uniform illumination of the front of the target 8 by light from the source 10. The extent of the light absorbent material 10 may be optimised for any particular tube for optimum eveness of illumination of the target 8.

The more uniform the illumination of the target 8 by light from the source 10, the more uniform the quiescent current flowing therein and the less variation there will be in black level shading across the target.

In order to adjust the amount of light conducted to the target 8, the position of light source 10 along the axis of the tube may be varied and/or further light absorbent material 13, again in this case matt black cellulose, may be provided around the tube envelope in the region of the light source 10 to absorb some of the light 11 entering the wall of the tube envelope.

The radius of curvature 14 where the face of the tube joins the main cylindrical body portion may be chosen in accordance with known light guiding principles to obtain optimum light conduction into the face wall of the tube. In a typical example, where the diameter of the tube is 30 m.m. the radius of curvature is 2 millimetres.

I claim:

1. A camera tube of the vidicon type comprising an envelope, closed at one end to form the face of the tube, which includes a sidewall, the face of the tube, and a portion joining said sidewall and said face; a light source within said envelope for emitting light which is conducted via said sidewall and said portion to said face; a target disposed between said light source and said face and sufficiently close to said face so that some of the light is conducted into said face to illuminate the target and cause a small quiescent current to flow therein while some of the light is reflected at said portion of the envelope tending to impinge directly on the target and produce non-uniform illumination thereof; and suppression means provided at said portion for reducing the internal reflection which produces direct impingement of light on said target so as to result in a more uniform illumination of the target and to cause a more uniform quiescent current to flow therein.

2. A tube as claimed in claim 1 and wherein said last mentioned means comprises light absorbent material provided on the outside of said portion of the tube envelope and framing said face thereof.

3. A tube as claimed in claim 2 including a target mesh electrode between said target and said light source and wherein the light absorbing material extends from the edge of the face of the tube inwardly towards and ends approximately at the projected outer boundary of the target mesh electrode of the tube.

4. A tube as claimed in claim 2 and wherein the light absorbing material is matt black cellulose.

5. A tube as claimed in claim 1 including a base located at that end of the tube opposite to the face, electrical connection means passing through said base, and a cathode heater connected to said electrical connection means, and wherein the light source is located on the axis of the tube and comprises a single filament positioned in the region between the cathode heater of the tube and the base of the tube.

6. A tube as claimed in claim 5 and wherein the light source is electrically connected to and supported by the electrical connector means so as to operate in parallel therewith.

7. A tube as claimed in claim 5 and wherein said light source is a filament similar to the filament of the cathode heater of the camera tube.

8. A tube as claimed in claim 2 and wherein light absorbent material is provided on the tube envelope in the region of the light source, so as to absorb a portion of the light from the source entering the envelope side walls.

9. A tube as claimed in claim 1 wherein said portion is of such dimensions as to cause an optimum amount of light to be conducted around said portion, past said suppression means and into said face of the tube.

* * * * *